United States Patent [19]
Mitchell

[11] Patent Number: 6,079,679
[45] Date of Patent: Jun. 27, 2000

[54] METHOD AND APPARATUS FOR SECURING MATERIAL

[76] Inventor: Patrick Mitchell, 202 Stovall Dr., Florence, Ala. 35630

[21] Appl. No.: 09/250,465

[22] Filed: Feb. 16, 1999

Related U.S. Application Data

[60] Provisional application No. 60/075,364, Feb. 20, 1998.
[51] Int. Cl.[7] .................................. A47B 96/06; A47F 1/10
[52] U.S. Cl. ........................... 248/229.16; 248/231.81; 248/301
[58] Field of Search ...................... 248/300, 301, 248/231.81, 213.2, 215, 224.8, 229.16, 231.71; 410/10, 11, 23

[56] References Cited

U.S. PATENT DOCUMENTS

| | | | |
|---|---|---|---|
| 2,500,837 | 3/1950 | Le Vine | 248/231.71 |
| 2,819,862 | 1/1958 | Limbach | 49/65 |
| 3,051,427 | 8/1962 | Alvarez | 248/224.8 |
| 3,575,371 | 4/1971 | Carlstedt | 248/215 |
| 4,397,438 | 8/1983 | Chapman | 248/229.16 |

*Primary Examiner*—Ramon O Ramirez
*Assistant Examiner*—David Heisey
*Attorney, Agent, or Firm*—Lanier Ford Shaver & Payne P.C.; Frank M. Caprio; Gerald W. Walsh

[57] ABSTRACT

The present invention provides a method and apparatus for securing material. In particular, the invention is basically an S-shaped device comprised of three substantially planar members and two substantially U-shaped connections used in conjunction with a toolbox mounted in a pickup truck. The exact configuration of the device can be modified to fit different types of toolboxes or other vertical supports, for example, inserting an L-shaped section for form fitting toolboxes. The device provides a tie point for securing cargo with ropes or similar restraining material. The device itself is secured by closing the lid of the toolbox and is essentially reversible in application due to its S-shape. Furthermore, the device can be used without restraining material to secure cargo with handles or loops. In this manner, the cargo, such as grocery bags, are secured and transported by looping the cargo handle over the tie point.

16 Claims, 2 Drawing Sheets

METHOD AND APPARATUS FOR SECURING MATERIAL

CROSS-REFERENCE TO RELATED APPLICATIONS

This application claims the benefit of U.S. Provisional application Ser. No. 60/075,364, filed Feb. 20, 1998, the disclosure of which is hereby incorporated by reference.

BACKGROUND OF THE INVENTION

This invention generally provides a tie point for toolboxes or similar supports and a method of securing materials during transit. More particularly, this invention provides a tie point for toolboxes mounted in the back of pickup trucks so that items may be secured while being carried in the truck.

Pickup and flatbed trucks are in widespread use throughout the United States. Millions of people use such trucks daily to carry items for business and personal purposes. The safest manner for carrying items in the back of a truck is to secure the items to a point in the truck bed so that the cargo does not shift during transit. In order to secure the items, rope, string, bungee cord, and the like, must be attached to some type of tie point in the back of the truck. The tie point has typically consisted of a hole, post, railing, or bolt-type protrusion mounted in the bed of the truck. Most popular commercially available pickup trucks include holes in the lip of the truck bedding that may be used as tie points.

One drawback with factory installed tie points is their permanent location. The tie point may be difficult to reach for certain applications, or create a problem in loading large cargo. It also may be preferable to remove the tie point when not in use for safety or aesthetic reasons. Thus, an adjustable and non-permanent tie point is desirous, so that it may be placed in an optimal location during use, and removed if no cargo is being carried.

Further, many modern pickup trucks either have no tie point, or have been modified so as to obscure the existing tie points. For example, a popular modification for pickup trucks is the installation of a plastic liner in the back of the truck that covers the lip of the truck bed, and therefore covers the potential tie points in the lip. These plastic liners often have a very slippery surface, thereby increasing the need to secure cargo during transit.

Another popular modification is the installation of a toolbox. Although the toolbox may provide a place to secure small items, the toolbox often becomes full, making it necessary to secure any additional cargo in the truck bed. However, installation of a toolbox across the front of the truck bed effectively obscures any potential tie points in the front of the truck bed. While objects may be tied to the tool box directly, this is usually inconvenient and could damage the toolbox. One way to overcome this problem is to install a tie point into the toolbox, such as installation of an I bolt. However, this may cause the toolbox to leak when rained upon or decrease the structural integrity of the toolbox. Additionally, any tie point that is physically attached to the toolbox or truck becomes a permanent fixture which may not be desired by the truck owner and, may become an obstacle when not in use as a tie point.

One item currently used to minimize the movement of cargo in a truck bed during transit is an expansion bar which stretches from one side of the truck to the other. This bar stops cargo from moving from the front end of the truck bed to the rear, but does not hinder side to side movement. This limitation makes it inadequate to tightly secure items that require special care during transit, such as fragile cargo. Furthermore, the expansion bar is essentially limited in application to light cargo. Finally, the expansion bar does not adequately secure commonly carried cargo such as grocery bags and small items of furniture.

Thus there is a need for a convenient, adjustable, and non-permanent way to secure cargo in a truck bed.

SUMMARY OF THE INVENTION

The present invention is essentially a rigid "S"-shaped device that may be used in connection with a toolbox or other vertical support to create a securing point for rope, string, bungee, or similar material being used to restrain cargo during transit. The device may also be used to secure materials with a loop or handle, such as plastic grocery bags, by placing the handle over the securing point without the need for rope or similar material. When the device is used in connection with a toolbox, it may be held securely in place by closing the toolbox lid. The device may also be sufficiently form fitting so that any weather seal of the toolbox is not compromised by the presence of the device.

One of the objects of the invention is to provide a small, removable device for use in conjunction with any vertical support to which rope, string, bungee, or similar material can be secured in order to stabilize material during transit.

Another object of the invention is to provide a small, removable device for use in conjunction with a toolbox in a truck bed which is secured when the lid to the toolbox is closed and to which rope, string, bungee, or similar material can be secured in order to stabilize material during transit.

Still another object of the invention is to provide a method of securing materials during transit using a small, removable device to which rope, string, bungee or similar material can be secured.

Another object of the invention is to provide a method of securing materials containing a loop or handle using a small, removable device to which the materials can be secured.

BRIEF DESCRIPTION OF FIGURES AND ATTACHMENTS

DETAILED DESCRIPTION OF THE INVENTION

Figure 1:
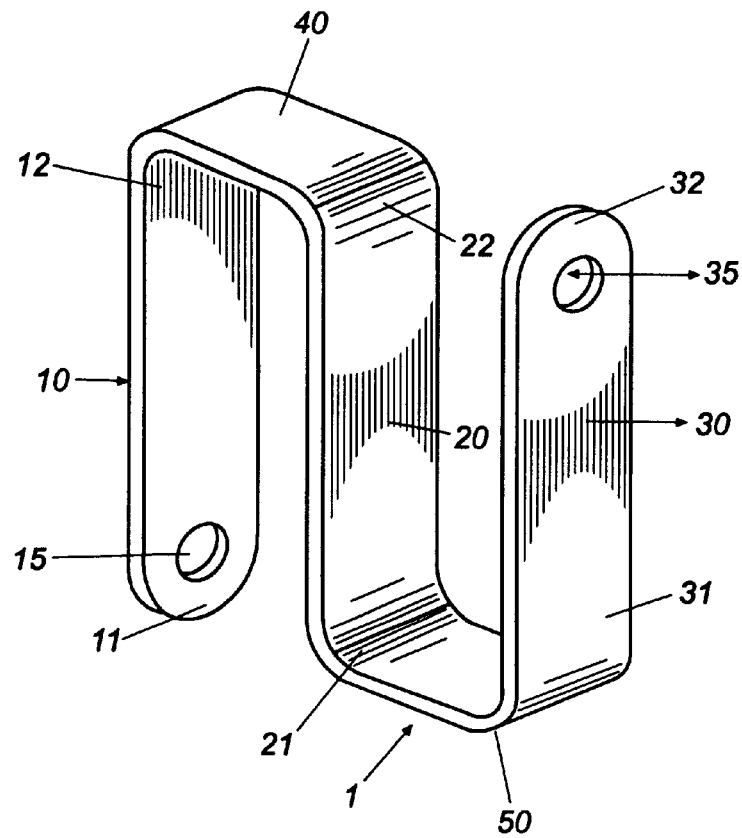
FIG. 1 is a drawing of one embodiment of the present invention for toolboxes with overlapping lids.
Figure 4:
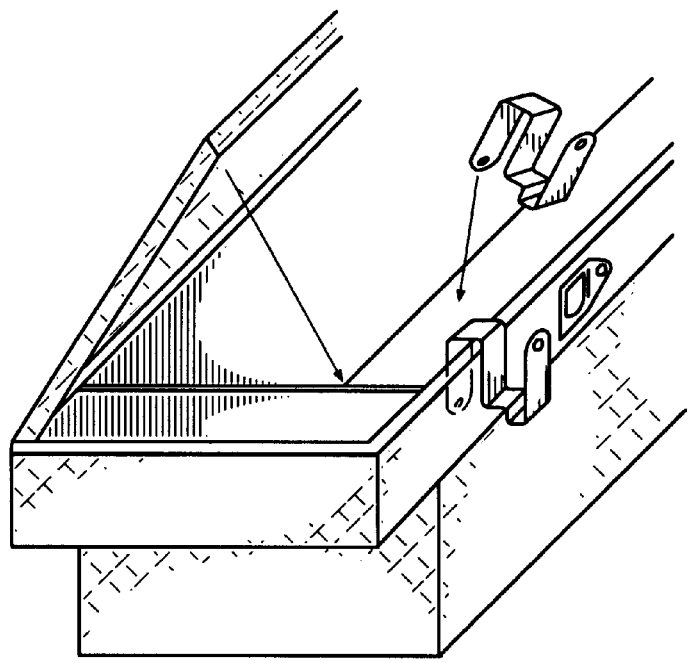
FIG. 4 is a drawing depicting one embodiment of the present invention attached to the lip of an open toolbox.

Referring to FIG. 1, the device 1 consists of three parallel planar sections 10, 20, and 30, each having a first end (11, 21, and 31, respectively) and a second end (12, 22, and 32, respectively). Although these sections will be referred to as "planar sections," one of skill in the art will recognize that perfectly flat planes are not required, so long as the sections are substantially planar. The second end 12 of the first planar section 10 may be attached to the second end 22 of the second planar section 20 by a first U-shaped connection 40. Additionally, the first end 21 of the second planar section 20 may be attached to the first end 31 of the third planar section 30 by a second U-shaped connection 50 to create an "S"-shaped device. The three planar sections, joined together with U-shaped connections 40, 50, at opposite ends of the middle planar section 20, create this "S"-shape. As shown in FIG. 4, the first planar section 10, together with the first U-shaped connection 40, may be placed over the front lip of the toolbox or other vertical support such that the first planar section 10 rests against the inside face of the toolbox or other vertical support, the first U-shaped connection 40 rests against the top lip of the toolbox or other vertical support and the middle planar section 20 is against the outside face of the toolbox or other vertical support. The third planar section 30 then automatically extends upwards to provide a tie point or a place to secure materials containing loops or handles. Planar sections 10 and 30 may both include optional openings 15, 35, that are useful to secure rope, bungee, or similar material. The openings are preferably in both planar sections 10 and 30 so that the device 1 may be reversed and either planar section may overhang the vertical support while the other section provides the tie point. The device 1 is secured in place merely by closing the toolbox lid. The location of the device 1 relative to the toolbox may be adjusted by opening the toolbox lid and moving the device 1. Preferably, two or more of the devices 1 are used simultaneously to provide multiple tie points for ease of securing cargo. As is readily apparent, the device 1 may also be used to overhang any other suitable vertical support, however, the user may lose the benefit of immobilizing the device with a toolbox lid.

The device may be manufactured out of any rigid material with sufficient strength to provide support for cargo. The device is preferably made from metal, and most preferably steel, and preferably treated with any known coating to prevent oxidation such as zinc, chrome, or paint. In the preferred embodiment, the device is molded from a single strip of metal so that the U-shaped connections 40 and 50 merely represent bends in the metal strip. The device may also be prepared by welding together appropriately shaped metal pieces, by inserting hinge-like connections, or by any other similar manufacturing means known to those of skill in the art.

The first planar section 10 should be long enough that it assists in securing the device 1 by providing supporting leverage against the inside of the front lip of the toolbox. The second and third planar sections 20, 30 are preferably the same length, or approximately the same length, as the first planar section 10, so that the tie point is conveniently located on the outside of the toolbox, and so that the device 1 retains reversibility. However, the length of the three planar sections may vary as desired. In the preferred embodiment, the device 1 is formed from ⅛ inch metal, such as steel, and the three planar sections 10, 20, and 30 are approximately 3 inches long and 1 inch wide. The U-shaped connection pieces 40, 50 may also vary in exact size and shape depending upon the intended use of the device 1. The distance between the planar sections 10, 20, and 30 may also vary depending upon the intended use. In the preferred embodiment, the distance between planar sections 10 and 20 and between 20 and 30 may be from ⅞ inches to 1 ½ inches. Preferably, the distances between planar sections 10 and 20 will be slightly different than the distances between planar sections 20 and 30 so that the device may simply be turned around if a different distance between the planar sections is desired to overhang different vertical supports.

Figure 2:
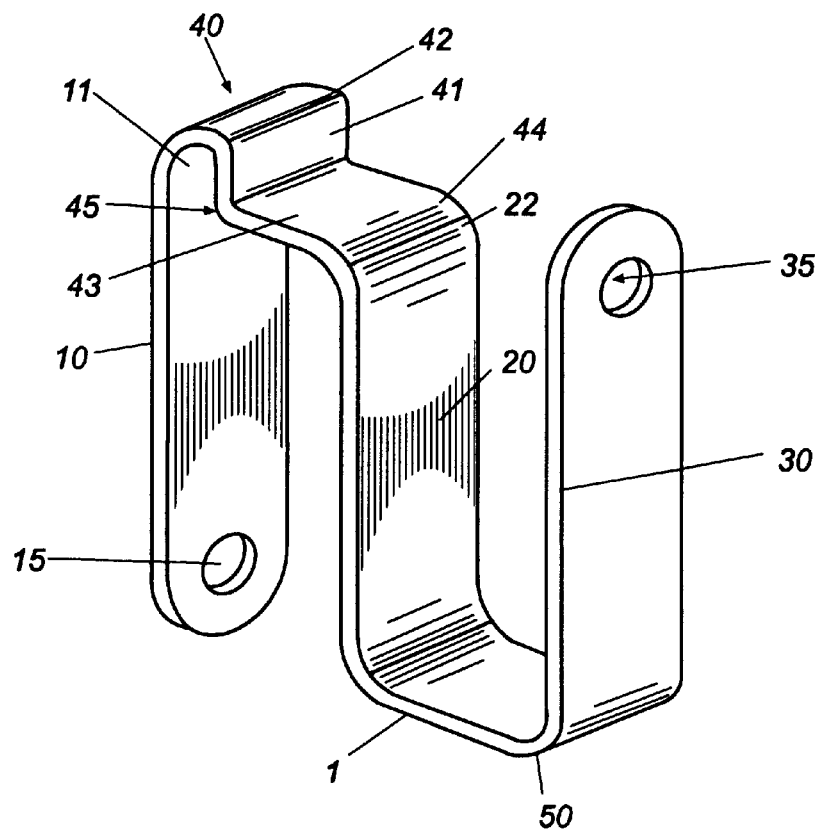
FIG. 2 is a drawing of the preferred embodiment of the present invention which includes one "L"-shaped or stair-stepped connection for toolboxes with a form-fitting lid.

Turning now to FIG. 2, an alternative embodiment of the present invention is disclosed which may be used with flush fitting toolbox lids. A flush fitting toolbox lid typically has a stair-stepped front lip, so that the lid closes on the stair step providing a substantially flat toolbox exterior when the lid is closed. The present invention creates a slight danger that a flush fitting lid may be distracted and not close properly when the device 1 is set in place. This problem is alleviated by modifying the U-shaped connection 40 in a manner that will more snugly fit a flush toolbox lid. Instead of a U-shaped connection alone, the connection may be modified to provide a U-shaped connection used in combination with an L-shaped or stair-stepped section 45 having a vertical member 41 with a top end 42 and a horizontal member 43 with a bottom end 44 that follows the contour of the toolbox lid. In this configuration, the U-shaped connection 40 attaches the first end 11 of the first planar section 11 and the top end 42 of the vertical member 41 of the L-shaped section 45. The bottom end 44 of the horizontal member 43 of the L-shaped section 45 is connected at an approximate right angle to the second end 22 of the second planar section 20, thereby making the first planar section 10 and the second planar section 20 substantially parallel. In this configuration, the planar section 20 is preferably shorter than the other two planar sections 10, 30, so that the device 1 retains its relative symmetry. In the preferred embodiment, the L-shaped section 45 preferably has a ¾ inch vertical member 42 and a ¾ inch horizontal member 43, and the distance between the first planar section 10 and the vertical member 41 of the L-shaped section is approximately ½ inch.

Figure 3:
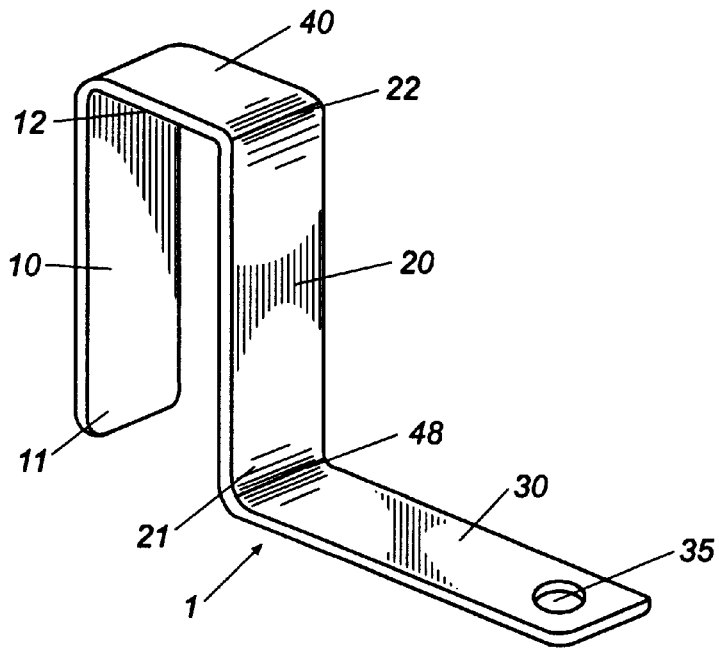
FIG. 3 is a drawing of an alternative embodiment of the present invention.

Another embodiment is depicted in FIG. 3. This embodiment creates a tie point in which the third planar section 30 is substantially perpendicular to the first and second planar sections, 10 and 20. The first planar section 10 and second planar section 20 are connected by the same U-shaped connection 40 depicted in FIG. 1 or the U-shaped connection used in combination with the L-shaped section depicted in FIG. 2. However, the second planar section 20 and third planar section 30 are attached by an L-shaped connection 48 such that the third planar section 30 is substantially perpendicular to the first and second planar sections.

Besides the conventional use of the device 1 as a tie point as described in the above embodiments, another use for the device 1, as depicted in both FIG. 1 and FIG. 2, is an improved way to secure cargo containing a handle. In particular, the device is well-suited for transporting plastic bags often used by grocery stores and general merchandise stores. The device is secured in place in the same manner when used as a tie point. Preferably, the device is secured approximately 8–10 inches from the side of the truck. The handle of the plastic bags are then looped over the third planar section 30. The weight of the material contained in the bags holds the bags closed. Additionally, the weight of the material keeps the bags secured on the device and eliminates movement of the bags or the materials contained therein during transit. The embodiment of the device shown in FIG. 3 is not suitable for this method because the third planar section 30 is parallel to the truck bed.

Although the device is primarily designed to overhang the front lip of pickup truck toolboxes, one of skill in the art will easily recognize other potential locations for using the device. Practically any vertical support which the device will overhang may be utilized, so that a tie point may be provided virtually anywhere. However, the toolbox application is preferred since the closed toolbox lid assists in securing the device while in use. If the device is used to overhang other surfaces, care should be taken to ensure that the device is secured. In some circumstances, horizontal movement along the horizontal surface of the toolbox or vertical support may not present a problem such that the device could be utilized without a need for separately securing the device. Preferably the device would be modified in manufacture to fit alternative surfaces. For example, the U-shaped connections may be modified to fit the contour of different surfaces. Also, the size of the planar surfaces may be adjusted to provide more securing leverage. Additionally, the third planar surface could be attached to the second planar surface in almost any manner to produce the desired angle between the third planar surface and the second planar surface. However, any embodiment in which the third planar section deviates from being substantially parallel to the second planar surface detracts from the reversibility of the device.

While various modifications and changes of the device described herein will be apparent to one having ordinary skill in the art, such changes are included in the spirit and scope of this invention, and the invention should not be limited by the specific embodiments described herein.

What is claimed is:

1. A device for securing material comprising:
   a) a first substantially planar section having a first end and a second end;
   b) a second substantially planar section having a first end and a second end;
   c) a third substantially planar section having a first end and a second end; and
   d) an L-shaped section having a vertical member with a top end and a horizontal member with a bottom end
   wherein the second end of the first substantial planar section is connected to the top end of said vertical member by a substantially U-shaped connection and the second end of the second substantially planar section is connected to the bottom end of said horizontal member, such that the first substantially planar section and the second substantially planar section are spaced apart and are substantially parallel, and the first end of the second substantially planar section and the first end of the third substantially planar section are connected such that the second substantially planar section and the third substantially section are spaced apart.

2. The device of claim 1, wherein the connection between the first end of the second substantially planar section and the first end of the third substantially planar section is a substantially U-shaped connection.

3. The device of claim 2 wherein the device is comprised of a metal.

4. The device of claim 3 wherein the device is comprised of steel.

5. The device of claim 2, wherein the first substantially planar section and the third substantially planar section contain openings that may be used as a tie point to secure materials.

6. A device for securing material comprising:
   a) a first substantially planar section having a first end and a second end;
   b) a second substantially planar section having a first end and a second end;
   c) a third substantially planar section having a first end and a second end; and
   d) an L-shaped section having a vertical member with a top end and a horizontal member with a bottom end
   wherein the second end of the first substantially planar section is connected to the top end of said vertical member by a substantially U-shaped connection and the second end of the second substantially planar section is connected to the bottom end of said horizontal member, such that the first substantially planar section and second substantially planar section are spaced apart and substantially parallel, and the first end of the second substantially planar section and the first end of the third substantially planar section are connected by a substantially U-shaped connection such that the second substantially planar section and third substantially planar section are spaced apart and substantially parallel and said first and third substantially planar sections contain openings that may be used as a tie point to secure materials.

7. A method for securing materials comprising:
   a) providing a device which has a first substantially planar section having a first end and a second end, a second substantially planar section having a first end and a second end, a third substantially planar section having a first end and a second end, and an L-shaped section having a vertical member with a top end and a horizontal member with a bottom end, wherein the second end of the first substantially planar section is connected to the top end of said vertical member by a substantially U-shaped connection and the second end of the second substantially planar section is connected to the bottom end of said horizontal member, such that the first substantially planar section and second substantially planar section are spaced apart and are substantially parallel, and the first end of the second substantially planar section and the first end of the third substantially planar section are connected such that the second substantially planar section and third substantially section are spaced apart;
   b) placing said device on top of a vertical support such that the substantially U-shaped connection and the L-shaped section rest on top of said vertical support;
   c) securing said device to prevent movement; and
   d) securing material to the device.

8. The method of claim 7 wherein the vertical support includes the lip of a toolbox, said lip having a shape substantially similar to the L-shaped section.

9. The method of claim 8 wherein the third substantially planar section of the device contains an opening and the material is secured to said opening.

10. The method of claim 9 wherein the first end of the second substantially planar section of the device is attached to the first end of the third substantially planar section of the device by a substantially U-shaped connection.

11. A method of claim 8 wherein securing said device to prevent movement is by closing the lid of the toolbox over the U-shaped connection.

12. A method for securing materials to a toolbox having a front lip and a lid, comprising:
   a) providing a device which has a first substantially planar section having a first end and a second end, a second substantially planar section having a first end and it second end, said second end of the second substantially planar section being connected to the second end of the first substantially planar section by a substantially U-shaped connection such that the first substantially planar section and second substantially planar section are spaced apart and substantially parallel, and a third substantially planar section having a first end and a second end, said first end of the third substantially planar section being connected to the first end of the second substantially planar section such that the second substantially planar section and third substantially planar section are spaced apart;
   b) placing said device over the lip of the toolbox such that the U-shaped connection rests on the lip of the toolbox;
   c) securing said device to prevent movement by closing the lid of the toolbox over the U-shaped connection; and
   d) searing material to the device.

13. The method of claim 12, wherein the third substantially planar section of the device contains an opening and the material is secured to said opening.

14. A method of claim 13 wherein said device has an L-shaped section having a vertical member with a top end and a horizontal member with a bottom end, wherein the second end of the first substantially planar section is connected to the top end of said vertical member by a substantially U-shaped connection and the second end of the second substantially planar section is connected to the bottom end of said horizontal member.

15. A method of claim 14 in the lip of the toolbox has a shape substantially similar to the L-shaped section.

16. A method of claim 15 wherein the first end of the second substantially planar section of the device is attached to the first end of the third substantially planar section of the device, by a substantially U-shaped connection.

* * * * *